United States Patent Office 3,319,396
Patented May 16, 1967

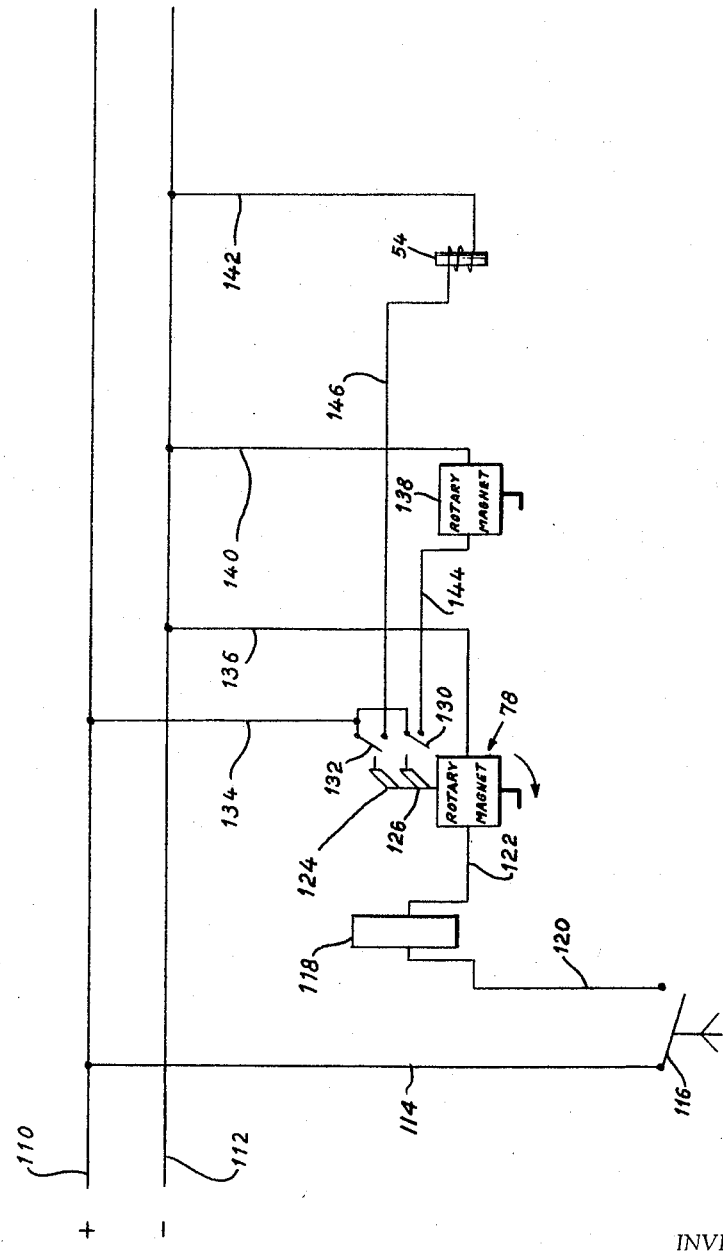

3,319,396
APPARATUS FOR DEPOSITING ARTICLES INTO CONTAINERS
Peter Hofer, Weil am Rhine, and Wilhelm Daniels, Haltingen, Kreis Lorrach, Germany, and Walter Oetliker, Allschwil, Basel-Land, Switzerland, assignors, by mesne assignments, to Maschinenfabrik Winkler, Fallert & Co. A.G., Bern, Switzerland, a corporation of Switzerland
Filed Dec. 5, 1963, Ser. No. 328,314
Claims priority, application Germany, Dec. 5, 1962, A 41,798
5 Claims. (Cl. 53—240)

The present invention relates to apparatus for handling articles and in particular to apparatus for depositing articles into containers. Thus, the present invention is particularly applicable to apparatus for depositing confections into boxes.

A primary object of the present invention is to provide a structure which is capable of automatically depositing an article into a container at a predetermined part thereof. Thus, in the case of pieces of candy and boxes for receiving the same the apparatus of the invention will deposit a particular piece of candy of a particular configuration to a particular part of a box.

Another object of the present invention is to provide a structure of the above type which is particularly designed for handling articles of predetermined configurations and which at the same time can be easily adapted for handling articles of different configurations.

A further object of the present invention is to provide a structure which will not only deposit an article into a container at a given location therein but which will also guarantee that the atricle will have a predetermined orientation relative to the container into which it is deposited.

Still another object of the present invention is to provide a structure which enables the part of the container which is to receive the article to be selected so that with the structure of the invention it is possible to deposit an article at a preselected part of a container.

The objects of the present invention also include the provision of an exceedingly simple and rugged apparatus which will operate reliably to accomplish the above results.

With the above objects in view the invention includes, in an apparatus for depositing articles into containers, a substantially horizontal supporting plate having an upper face part of which forms a receiving area for receiving, one by one, articles which are to be deposited, this plate having spaced from this receiving area thereof a depositing area where the plate is formed with an opening through which an article may move downwardly into a container beneath the supporting plate. A shifting means is located over the plate in relatively close proximity to the upper face thereof for shifting an article from the receiving area to the depositing area with the article aligned with the opening of the plate, and a conveyor means is located beneath the supporting plate for conveying beneath the latter a container for receiving an article. Finally, a blocking means is operatively connected to the plate for movement relative thereto between a blocking position where the blocking means blocks the opening to prevent an article from moving downwardly therethrough and an unblocking position where the blocking means unblocks the opening so that an article may then move downwardly therethrough into a container, and the blocking means unblocks the opening when a predetermined part of the container is aligned beneath the opening so that in this way an article will move down through said opening into the container to be deposited at the predetermined part thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a wiring diagram illustrating how electrical units of the assembly are interconnected.

Figure 1:
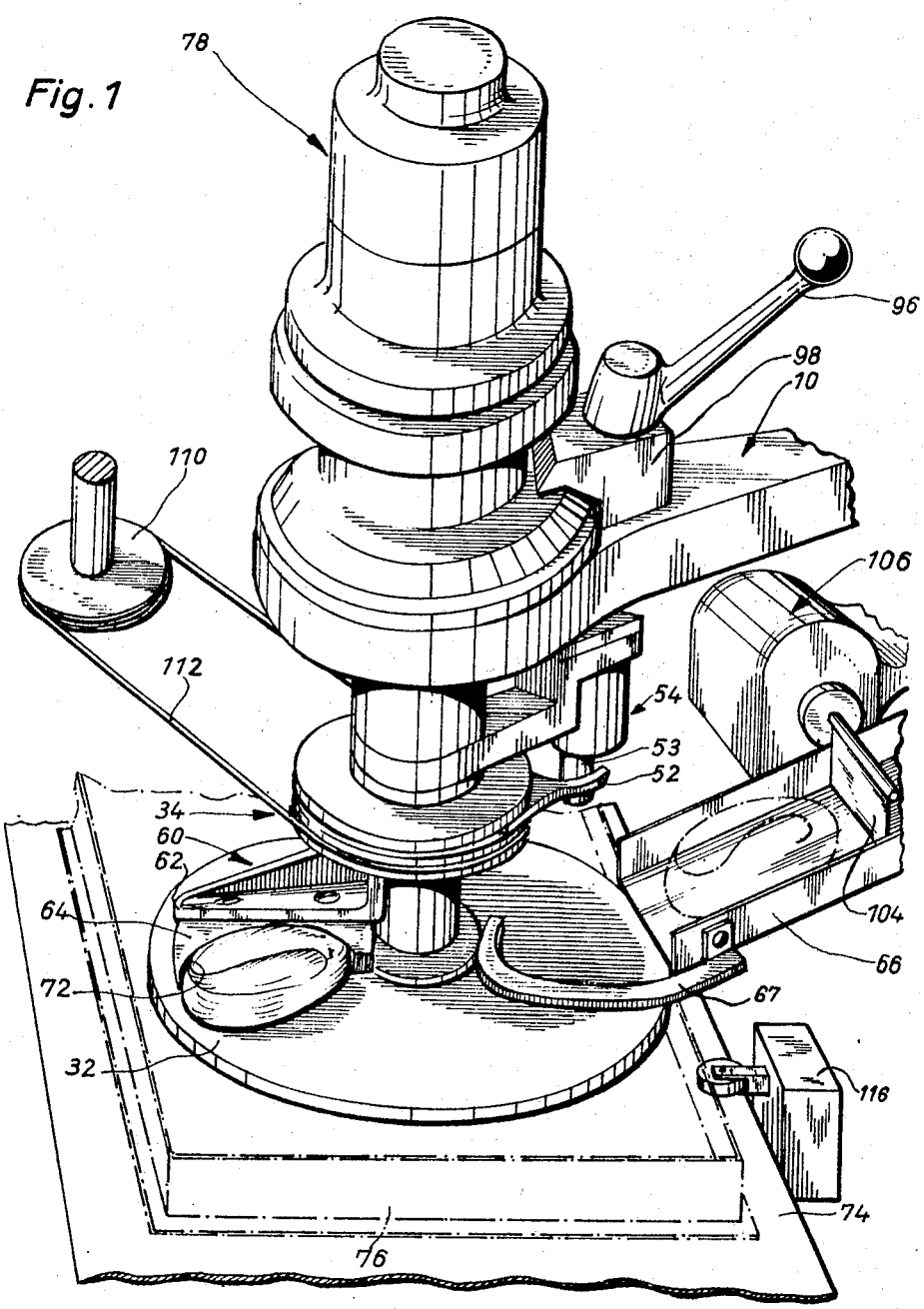
FIG. 1 is a perspective, partly fragmentary, illustration of one possible embodiment of a structure according to the present invention.
Figure 2:
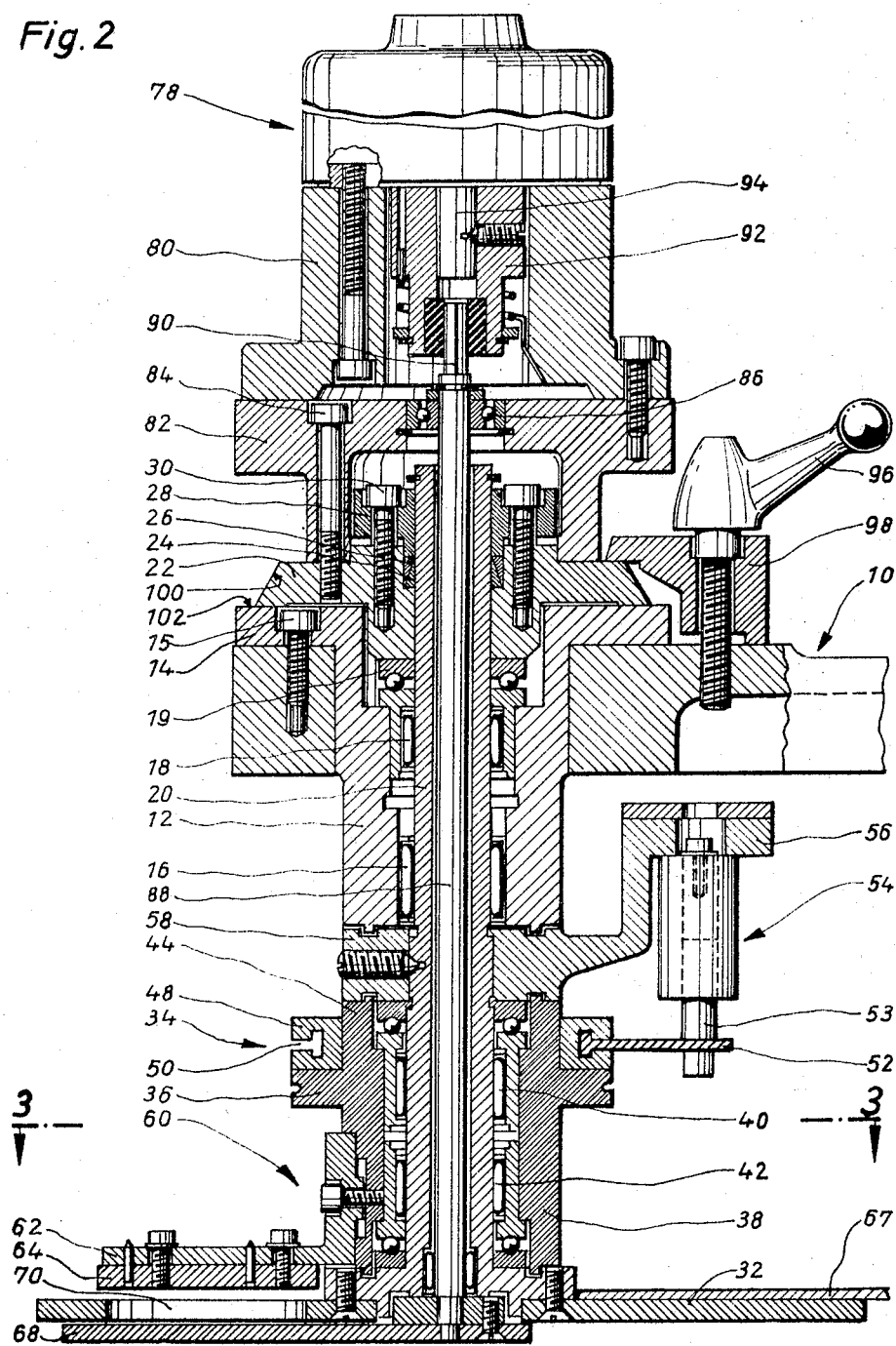
FIG. 2 is a sectional elevation of the structure of the invention.

Referring in particular to FIGS. 1 and 2 of the drawings, there is illustrated therein a stationary arm 10 which forms part of the supporting framework for the structure of the invention. As is particularly apparent from FIG. 2 the free end of the arm 10 is formed with an opening passing therethrough and, of course, the arm 10 is substantially horizontal. A bearing member 12 is carried by the arm 10 and extends downwardly through the opening thereof, as is particularly apparent from FIG. 2, and at its upper end the bearing 12 has an integral outwardly directed flange 14 formed with openings which pass therethrough and which receive bolts 15 which extend into threaded bores of the arm 10 for fixing the bearing 12 to the arm 10. This bearing 12 is provided adjacent its lower end with a needle bearing assembly 16 and above the needle bearing assembly 16 with a needle bearing assembly 18, this latter needle bearing assembly being combined with a ball bearing 19 which forms a thrust bearing.

An elongated hollow shaft 20 extends downwardly through the bearing 12 and the bearing assemblies 16, 18, and 19 serve to support the shaft 20 in the bearing 12 for angular movement relative to the axis of the elongated hollow shaft 20 for a purpose described below. The structure which carries the shaft 20 includes an annular adjusting member 22 which, in a manner described below, is angularly adjustable relative to the bearing 12 so as to adjust also the angular position of the shaft 20, and the shaft 20 is fixed in a manner described below to the annular adjusting member 22 so as to be angularly turnable therewith. As is apparent from FIG. 2 the annular adjusting member 22 has an outer peripheral portion which rests on the flange 14 of the bearing 12. Annular gripping members 24 and 26 which have oppositely tapered cross sections and which are of a well known construction are located in a recess of the adjusting member 22 resting on a shoulder thereof and the inner member 24 surrounds the shaft 20 while the outer member 26 surrounds the inner member 24 and engages the surface of the adjusting member 22. A gripping member 28 slidably surrounds an upper portion of the shaft 20, and this member 28 has an outwardly directed flange formed with openings through which bolts 30 respectively pass into threaded engagement with the adjusting member 22, as illustrated in FIG. 2, so that by turning the bolts 30 the gripping member 28 will be urged downwardly, as viewed in FIG. 2, to cause the member 24 to tightly grip the shaft 20 as well as to be tightly gripped by the member 26 which in turn is tightly pressed against the surface of the member 22 which surrounds the member 26, so that in this way the turning of the bolts 30 provides a secure but releasable connection between the shaft 20 and the adjusting member 22.

Figure 3:
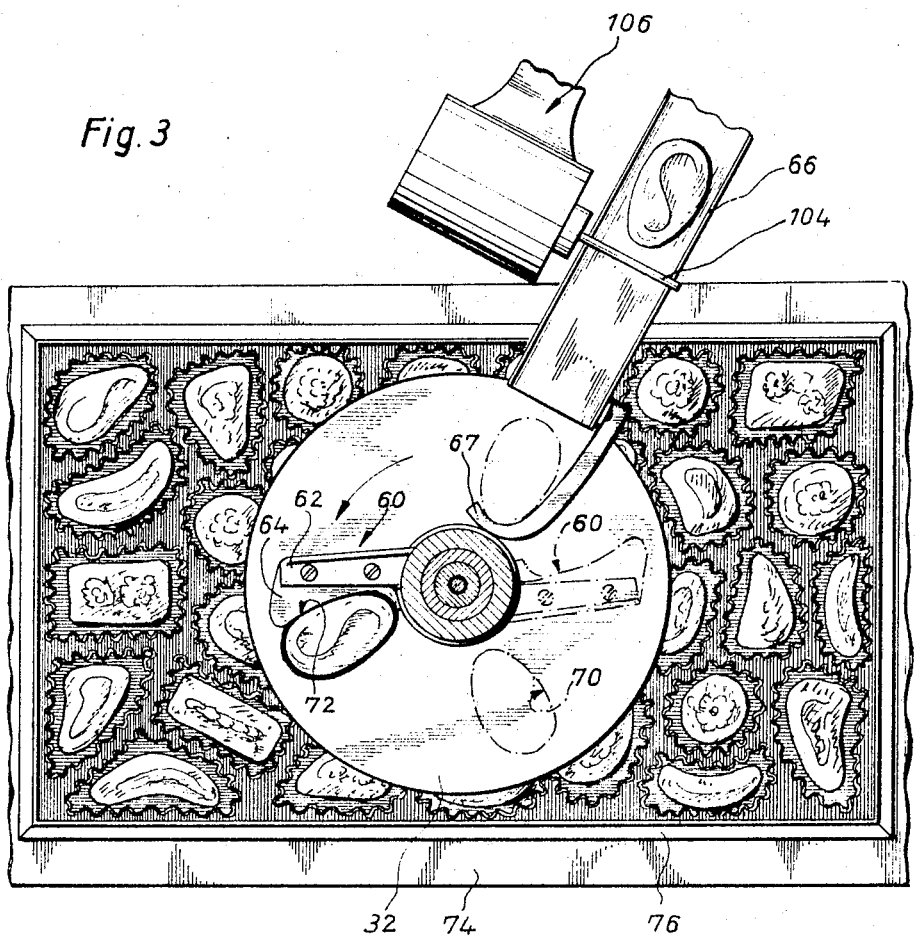
FIG. 3 is a plan view taken along line 3—3 of FIG. 2 in the direction of the arrows and showing in particular a container beneath the structure of the invention for receiving an article which is to be deposited into the container.

At the lower part of FIG. 2 as well as in FIG. 1, and indeed in FIG. 3, there is shown a supporting plate 32 of the present invention which in the illustrated example has a circular periphery, and at its center this supporting plate 32 is formed with an opening with which the shaft 20 is aligned. As is particularly apparent from FIG. 2 screw members, the heads of which are countersunk into the underside of the plate 32, extend through the latter into threaded engagement with a flange of the shaft 20 at the lower end of the latter so that in this way the supporting plate 32 is rigidly fixed with the shaft 20. The supporting plate 32 has an upper face part of which forms a receiving area for receiving an article such as a confection from a chute 66 in the illustrated example, and such articles are delivered one by one to the receiving area at the upper face of the plate 32, this receiving area of course being aligned with the bottom outlet end of the chute 66 which it will be noted has a width slightly greater than the article which is delivered to the supporting plate 32 so that in this way the article will have a predetermined orientation when it reaches the receiving area at the upper face of the horizontal plate 32.

A locating means is located on the supporting plate 32 at the receiving area thereof for locating an article received at this receiving area so as to determine the orientation of the article relative to the supporting plate 32, and this locating means in the illustrated example takes the form of an elongated member 67 having, for example, a configuration as shown in FIGS. 1 and 3 and located directly at the outlet of the chute 66 on the top surface of the plate 32. The configuration of the locating means 67 conforms at least substantially to the outline of the article along part of the periphery thereof so that as the article moves downwardly out of the chute 66 it will engage the locating means 67 to have its position determined thereby, and in fact such an article is shown in this position in dot-dash lines in FIG. 3.

The plate 32 has, spaced from the above-described receiving area, a depositing area where the plate is formed with an opening 70 through which an article may move downwardly into a container beneath the plate 32, such a container being shown by way of example in dot-dash lines in FIG. 1 in the form of a candy box 76 which is also shown in FIG. 3 with candy already located therein. The opening 70 at the depositing area of the supporting plate 32 has a configuration which conforms at least substantially to the outline of the article so that the orientation of the latter will remain unchanged as it moves downwardly through the opening 70.

A shifting means is located over the plate 32 adjacent to its upper face but spaced therefrom by a distance at least as great as the thickness of the locating member 67, for shifting an article from the receiving area to the depositing area, and in the illustrated example this shifting means includes a sleeve 38 which surrounds the shaft 20 and is supported thereon for rotary movement by the needle bearings 40 and 42 each of which is combined with a ball thrust bearing, as indicated in FIG. 2. The shifting means includes in addition to the rotary sleeve 38 a flange 36 which is integral with the sleeve 38 and forms a pulley, this flange 36 being formed at its outer periphery with a groove which receives the endless belt 112 which is shown in FIG. 1. The rotary shifting means includes a cylindrical extension 44 of the sleeve 38 which extends upwardly from the pulley 36, and a ring 48 surrounds and is fixed to the cylindrical extension 44, so that the ring 48 also turns with the sleeve 38. The ring 48 is formed along its outer periphery with a T-slot 50 which receives a projecting member 52 which can be adjustably fixed in the ring 48 so that the angular position of the projecting member 52 along the ring 48 can be changed whenever desired. For example, the ring 48 may be formed with threaded bores receiving set screws capable of being screwed tightly against the projecting member 52 for fixing the latter in a selected angular position to the ring 48.

As may be seen from FIG. 1, a motor through a suitable transmission rotates the pulley 110 which drives the belt 112 so as to turn the pulley 36 and thus the sleeve 38 of the rotary shifting means 34, and a releasable stop means cooperates with the projecting member 52 of the rotary shifting means for releasably holding the latter in a predetermined position, the rotary shifting means 34 being shown in this position in FIGS. 1 and 2. The releasable stop means includes a stop member 53 which has a stop position located in the path of turning movement of the projecting member 52 so as to engage the latter and prevent turning of the shifting means 34 by the belt 112 which at this time simply slips with respect to the pulley 36 so that this combination of the belt and pulley provides not only a motion transmission but also the equivalent of a slip clutch where whenever the stop member 53 is in the path of movement of the projection 52 the pulley 110 can keep turning but the belt 112 will simply slip with respect to the pulley 36. The stop means includes in addition to the stop member 53 an electromagnet 54 which in a well known manner when energized will retract the stop member 53 upwardly out of the path of the projecting member 52 so that now the pulley 36 will turn with the belt 112 and the rotary shifting means 34 will be rotated. The electromagnet 54 is mounted on an arm of a support member 58 through which the hollow shaft 20 passes and this support member 58 is fixed to the hollow shaft by a set screw, as shown most clearly in FIG. 2. It will be noted from FIG. 2 that the portion of the support member 58 through which the shaft 20 passes is situated between the bearing 12 and the cylindrical projection 44 of the sleeve 38.

As is shown most clearly in FIGS. 1 and 2, the rotary shifting means includes a radial assembly 60 which is fixed to the sleeve 38 for rotation therewith and which includes an arm 62 projecting radially from the sleeve 38 and located over the plate 32. The arm 62 has an angular cross section and is quite rigid. The underside of the radial arm 62 engages a member 64 which is fixed to the arm 62 at the underside thereof by any suitable means such as the screws shown in FIG. 2, and the distance between the bottom surface of the member 64 and the top face of the plate 32 is no less than the thickness of the locating means 67 and is preferably slightly greater than the thickness so that the rotary shifting means 34 can move freely over the locating means 67 without engaging the latter. The member 64 is an article-engaging member which has an edge portion 72 the configuration of which conforms at least substantially to the configuration of the article at least along the portion thereof which is engaged by the edge 72. The rotary shifting means 34 turns in a counterclockwise direction, as viewed in FIGS. 1 and 3, this direction being indicated by the arrow of FIG. 3. Thus, when the electromagnet 54 retracts the stop member 53 the rotary shifting means 34 will turn and pass over the locating means 67 into engagement with an article at the receiving area of the plate 32 and the continued turning of the shifting means 34 will transport the article to the depositing area where the opening 70 is situated, and when the stop member 53 has retracted so as to release the projecting member 52 which immediately moves beyond the stop member 53, the magnet 54 is deenergized so that the stop member 53 will immediately return to its stop position located in the path of turning of the projecting member 52 and thus when the shifting means has completed a revolution it will be automatically stopped, and the adjustment of the member 52 with respect to the ring 48 is such that when the member 52 engages the stop member 53 the article-engaging member 64 will position the article at the depositing area of the plate 32 precisely in alignment with the opening 70 which has a configuration substantially conforming to that of the article so that the article when moving through the opening 70 will remain oriented in a given direction.

A conveyor means in the form, for example, of an endless conveyor band 74 conveys beneath the plate 32 the containers 76 which have been referred to above, and in a manner described below when a predetermined part of the container 76 is aligned beneath the opening 70 an article in a predetermined orientation relative to the container will be deposited therein precisely at a predetermined location in the container.

However, the article which is placed in the above-described manner in alignment with the opening 70 at the depositing area of the plate 32 cannot move down through the opening 70 until this opening is unblocked since it is usually blocked by a blocking means which includes a blocking member 68 which extends at least part of the way across the opening 70 in the blocking position of the blocking member 68, this member being situated beneath the plate 32 between the latter and the conveyor 74. The elongated shaft 88 forms part of the blocking means and its bottom end which is fixed to the blocking member 68 terminates at an elevation slightly lower than the plate 32 with the blocking member 68 of course located also beneath the plate 62, so that it is the shaft 88 which extends through the central opening of the plate 32 so as to be connected in this way to the blocking member 68. The shaft 88 of the blocking means extends upwardly beyond the hollow shaft 20 and at its top end the shaft 88 is operatively connected with a rotary magnetic means 78 which also forms part of the blocking means. It will be seen that the top end portion of the shaft 88 is supported by a ball bearing 86 for rotary movement, this bearing 86 being carried by a member 82 which is fixed to the adjusting member 22 by the screws 84 as illustrated in FIG. 2. This member 82 in turn carries a member 80 which is fixed to the member 82, and suitable screws extend through bores of the member 80 for fixing to the latter at the upper end thereof the rotary magnetic means 78 which has a well known construction providing an angular turning of the armature of the electromagnet in response to energizing thereof. Thus, when the rotary magnetic means 78 is energized the armature 94 will turn through a given angle and through a suitable set screw this armature 94 is fixed to a sleeve 92 into which the armature 94 extends, and this sleeve 92 in turn carries at its bottom end a member having a non-circular bore which receives the non-circular upper elongated free end portion 90 of the shaft 88 so that rotary movement of the electromagnet 78 will be transmitted to the shaft 88 and through the latter to the blocking member 68. Thus, this blocking means which extends from the member 68 through the shaft 88 to the rotary magnetic unit 78 is capable of turning the blocking member 68 between a blocking position where it blocks the opening 70 so that an article cannot move downwardly therethrough and an unblocking position where it is out of alignment with the opening 70 so that an article can then pass downwardly therethrough into a container 76.

As was indicated above the adjusting element 22 enables the plate 32 to have its angular position adjusted. In other words when the member 22 is turned, the shaft 20 which is fixed thereto in the above-described manner will also turn within the stationary bearing 12, and the supporting plate 32 which is fixed to the shaft 20 will also turn so that the angular position of the plate 32 and thus the position of its opening 70 will be adjusted. In order to releasably maintain the adjusting member 22 in an adjusted position the arm 10 is formed with a threaded bore receiving a threaded portion of a member 96 which extends through an opening of a releasable clamp 98 engaging the arm 10 and the member 22 so that when the member 96 is tightened the member 22 will be held in an adjusted angular position, and at any time the operator can turn the member 96 to loosen the clamp 98 and thus release the member 22 for angular adjustment. It will be noted that when such angular adjustment is carried out all of the above-described structure with the exception of the bearing 12 and the arm 10 as well as the clamping member 98 and the member 96 will turn as a unit. The adjusting member 22 has a beveled peripheral surface carrying a scale 100 which cooperates with a scale 102 on the upper face of the flange 14 so that these scales may be matched in a preselected manner for providing an adjusted position of the plate 32. Through this adjustment the location of the opening 70 relative to a container 76 can be adjusted and thus the part of the container 76 which will receive the article can be predetermined.

Although the articles move one at a time down the chute 66, there is arranged in their path of downward movement a gate 104 which engages an article to prevent it from moving all the way to the plate 32, and an electrically controlled device 106 is operatively connected to the gate 104 to turn the latter upwardly to release an article for movement down to the plate 32 only after the previous article has been transported away from the receiving area.

Assuming that the rotary shifting means 34 has shifted an article from the receiving area to the depositing area where it is in alignment with the opening 70, then of course the projecting member 52 engages the stop member 53 and the belt 112 is slipping, as described above. When a predetermined part of a container 76 is aligned beneath the opening 70 a pair of switch contacts will engage each other to close a circuit for energizing the rotary magnetic means 78 which will turn the blocking member 68 from its blocking to its unblocking position and the article will then immediately drop through the predetermined area of the container 76. The circuit of the rotary magnetic unit 78 can be closed either by contacts which are actuated by the conveyor 74 or by arranging contacts to be actuated by each container 76 as it reaches a predetermined location beneath the plate 32, and actually this latter arrangement is preferred since in this way the matching of the location of the opening 70 to the box 76 itself will be assured. These contacts which are closed by the box 76 are in the form of light-springy contacts which can easily be deflected by the box 76 to become closed without any danger of the box 76 shifting on the conveyor band 74. As soon as an article has in this way moved through the opening 70 into the container the container moves beyond the plate 32, and the magnetic unit 78 is deenergized so that the blocking means returns to its blocking position, and at the same time the magnet 54 is energized to retract the stop member 53 to its release position so that in the manner described above the rotary shifting means will again turn to shift the next article to the depositing area and of course immediately after the stop member 53 has been retracted the solenoid 54 becomes deenergized so that it will locate the stop member 53 in the path of turning of the member 52 to limit the shifting means to a single revolution for precisely locating the article at the opening 70 in the manner described above. It is to be noted that the configuration of the edge 72 of the member 64 so that it conforms closely to the configuration of the article which is shifted prevents the article from moving radially on the plate 32 and constrains the article instead to move only circularly from the receiving area to the depositing area. As may be seen from FIG. 3, the above-described adjusting structure which can be loosened by loosening the member 96 enables the opening 70 to be shifted to any desired location such as from that location which is shown in solid lines in FIG. 3 to one which is shown in dot-dash lines in FIG. 3. Moreover, the entire arm 10 is capable of being longitudinally shifted on its support so that the entire structure can be shifted laterally with respect to the container, and thus this combination of lateral adjustment and angular adjustment of the plate 32 makes it possible to deposit an article to any preselected part of the container 76. Furthermore, it is to be noted that during the angular adjustment of the plate 32 in the manner described above the chute 66 remains stationary and the locating means 67 while engaging the top surface of the plate 32 is fixed to the chute 66 at its outlet end so that during angular adjustment the top surface of the plate 32 simply slips with respect to the locating means 67 which also remains stationary.

The above-described structure of the invention is one of a series of identical structures which are arranged in a row beside each other over the upper run of the endless conveyor band 74. The chutes 66 of the several assemblies direct identical articles one after the other to the several plates 32, and all of these plates are adjusted differently both laterally and angularly with respect to the conveyor so that when a certain part of a container 76 becomes aligned with a given one of the plates 32 beneath the opening 70 thereof a particular type of confection will be deposited to a particular location in the container 76, and in this way as a container 76 moves beneath a row of these assemblies of the invention it will be filled with differently shaped articles according to a predetermined pattern as shown most clearly in FIG. 3. With such a construction all of the arms 10 which carry the structures of the invention can be supported on a common supporting frame.

The movement of the blocking member 68 to its unblocking position can control a circuit which becomes automatically closed to energize the mechanism 106 for turning the gate 104 to release the next article for movement to the receiving area of the plate 32 once the previous article has moved down through the opening 70. The articles may be delivered to the chutes 60 from suitable supplies which are periodically provided with articles to be delivered to the chutes 66.

Referring to FIG. 4, there is illustrated therein a source of direct current which includes the positive conductor 110 and the negative conductor 112. The conductor 110 is connected through a conductor 114 to the movable contact of a switch 116. As is indicated in FIG. 1, the switch assembly 116 is located beside the conveyor 74 to be engaged by the successive containers 76 so as to be closed by each container 76. The stationary contact of the switch 116 is connected through a conductor 120 to a delay relay 118 which is connected through the conductor 122 to the rotary electromagnet 78. The rotary electromagnet 78 controls the movable contacts of a pair of switches 130 and 132 through-actuating members 126 and 124, respectively, which are turned by the rotary electromagnet 78 when the latter is energized. The pair of switches 130 and 132 are electrically connected by the conductor 134 to the positive conductor 110. The rotary electromagnet 78 is connected to the negative conductor 112 by a conductor 136. The control unit 106 for the release gate 104 includes the electromagnet 138 which is connected by a conductor 140 to the negative conductor 112 and by a conductor 144 to the stationary contact of the switch 130. The electromagnet 54 which actuates the stop member 53 is connected to the negative conductor 112 by a conductor 142 and to the stationary contact of the switch 132 by a conductor 146.

When the switch 116 is closed by a moving container 76, the rotary electromagnet 78 is energized through the delay relay 118 which at this time electrically interconnects the conductors 120 and 122. Thus, the blocking member 68 will be turned from its blocking to its unblocking position to release an article in the opening 70 for movement into the container 76, as described above. The turning of the rotary electromagnet 78 will produce turning of the switch-actuating members 124 and 126 which will respectively close the switches 132 and 130 when the member 68 has reached its unblocking position, so that at this time the magnets 138 and 54 will become simultaneously energized to release an article by raising of the gate 104 as well as to release the member 52 so that the arm 60 will now turn. In this way the arm 60 will with the member 64 which is fixed thereto engage an article which has in the meantime moved to the receiving area as a result of the raising of the gate 104. This article will thus be shifted to the opening 70 in the manner described above. In the meantime the delay relay 118, which is set to electrically interconnect conductors 120 and 122 only forms a period of time required for the blocking member 68 to reach its unblocking position and for the switches 130 and 132 to be closed, automatically interrupts the connection between the conductors 120 and 122 so that the blocking member 68 returns to its blocking position and the switches 130 and 132 are opened after having been closed only momentarily so as to momentarily energize the magnets 138 and 54. FIG. 2 shows a coil spring connected at one end to the member 80 and at its other end to the sleeve 92 for returning the rotary electromagnet 78 and the parts connected thereto to their rest position in which the blocking member 68 is in its blocking position and the switches 130 and 132 are open. In this way the stop member 53 will be in the path of turning the projection member 52 to limit the arm 60 to one revolution, and of course all of the parts will again be in a position to repeat the above operation with respect to the next container 76. Of course, as soon as one container moves beyond the switch 116 it automatically opens so as to be closed by the next following container to repeat the above operations.

Of course, instead of providing a belt 112 which will slip with respect to the pulley 36 it is possible to use a conventional slip clutch or a one-way drive, but the above-described structure is preferred because of its simplicity.

Moreover, it is possible to provide a structure which when the blocking means is about to be moved to its unblocking position lowers the plate 32 toward the container so that the article moves downwardly through only a relatively short distance before resting on the bottom of the container. Then the plate 32 rises to its initial position and the above-described operations are repeated. Where the circuit which controls the blocking means is actuated by the containers themselves, the contacts which are closed by the containers are of course adjustably supported on suitable guides so that their positions relative to the containers can be adjusted and thus the instant when the blocking member 68 is shifted to its unblocking position can be controlled.

Of course, the series of units according to the invention which are arranged in a row as described above will not always be used to deliver the same articles to precisely the same containers, so that for the purpose of adapting the structure to articles of widely varying configurations which will be provided in containers of widely differing sizes and shapes, the plates 32 are removably connected to the bottom end of the shafts 20, respectively, and also the members 64 are removably connected to the arms 62. Thus, for each unit there will be a series of plates 32 all having differently shaped openings 70 and by selecting a suitable plate 32 to be attached to the bottom end of the shaft 20 the particular unit will be adapted for an article of a particular configuration, and of course for each plate 32 there is a corresponding locating means 67 and a corresponding member 64 which are respectively attached to the chute 66 and the arm 62 so that in this way by providing a plurality of interchangeable parts for each unit it is possible to adapt each unit to articles of widely differing configurations.

It will be understood that each of the elements described above, or two or more together, may also find a useful application in other types of article handling apparatus differing from the types described above.

While the invention has been illustrated and described as embodied in apparatus for depositing articles into containers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for depositing articles into containers, in combination, a substantially horizontal supporting plate having an upper face part of which forms a receiving area for receiving, one by one, articles which are to be deposited, said plate having spaced from said receiving area a depositing area formed with an opening through which an article can move to a container located beneath said plate; rotary shifting means located adjacent to said upper face of said plate for turning relative thereto for engaging an article at said receiving area and shifting the latter to said depositing area in alignment with said opening, said rotary shifting means including a projecting member adjustably connected to the remainder of the rotary shifting means; drive means operatively connected to said rotary shifting means for rotating the latter; releasable stop means operatively connected to said rotary shifting means for stopping the movement thereof by said drive means at a position where said rotary shifting means locates the article in alignment with said opening, said releasable stop means comprising a stop member and an electro-magnet operatively connected thereto for moving said stop member between a stopping position arresting said rotary shifting means in said position where the article is aligned with said opening and a release position releasing said rotary shifting means for rotary movement to engage an article and shift the latter to said depositing area where said stop means arrests the movement of said shifting means, said stop member when in stopping position being located in the path of turning movement of said projecting member for engaging the latter and arresting the movement of said rotary shifting means until the electro-magnet moves said stop member to said release position in which it is located out of the path of said projecting member; conveyor means located beneath said plate for conveying beneath the latter a container for receiving an article which moves through said opening; and blocking means operatively connected to said plate for movement relative thereto between a blocking position blocking said opening to prevent an article from moving therethrough and an unblocking position freeing said opening so that an article in alignment therewith will move therethrough into a container, said blocking means moving from said blocking to said unblocking position thereof when a container beneath said plate is in a predetermined position relative to said opening so that an article will then move through said opening into said container to be deposited therein at a predetermined location in said container.

2. In an apparatus for depositing articles into containers, in combination, a substantially horizontal supporting plate having an upper face part of which forms a receiving area for receiving, one by one, articles which are to be deposited, said plate being formed with a first opening and having spaced from said receiving area a depositing area where said plate is formed with a second opening located between said first opening and the periphery of said plate; an elongated hollow supporting shaft fixed to said plate and extending upwardly therefrom for supporting said plate, the hollow interior of said shaft being aligned with said first opening; rotary shifting means carried by said shaft for movement thereabout, said rotary shifting means engaging an article located at said receiving area and shifting the latter to said depositing area into alignment with said opening so as to move therethrough into a container located beneath said plate; an elongated inner shaft extending through the hollow interior of said supporting shaft and having a bottom end located at an elevation slightly lower than said supporting plate and an upper end extending upwardly beyond said supporting shaft; conveyor means located beneath said plate for conveying beneath the latter a container for receiving an article which moves through said opening; a blocking member fixed to said bottom end of said elongated inner shaft and turnable with the latter; and rotary magnetic means operatively connected to said upper end of said shaft for turning the latter to displace said blocking member between a blocking position where said blocking member extends across at least part of said opening to prevent an article from moving downwardly therethrough and an unblocking position where said blocking member is out of alignment with said opening to free the latter so that an article can move downwardly therethrough, said rotary magnetic means turning said blocking member from said blocking to said unblocking position when a predetermined part of the container is aligned beneath said opening so that an article in alignment with said opening will be deposited at said predetermined part of said container.

3. In an apparatus for depositing articles into containers, in combination, a substantially horizontal supporting plate having an upper face part of which forms a receiving area for receiving, one by one, articles which are to be deposited with a predetermined position, said plate having spaced from said receiving area a depositing area formed with an opening through which an article is adapted to move downwardly into a container beneath said plate; shifting means located over said plate adjacent to said upper face thereof for shifting an article from said receiving area to said depositing area into alignment with said opening and for maintaining said article in said predetermined orientation identical with the orientation of all other such articles; conveyor means located beneath said plate for conveying beneath the latter containers for receiving articles; blocking means operatively connected to said plate for movement relative thereto between a blocking position blocking said opening to prevent an article from moving downwardly therethrough and an unblocking position unblocking said opening to free the latter so that an article may move downwardly therethrough into a container in a predetermined orientation identical with that of all other articles, said blocking means moving to said unblocking position thereof when a predetermined part of a container conveyed by said conveyor means is located beneath said opening so that the article will be deposited in a predetermined orientation identical with that of all other articles at said predetermined part of said container; and support means adjustably supporting said plate for adjustable movement relative to said conveyor means so that the location of said supporting plate relative to containers on said conveyor means can be adjusted, said support means supporting said plate for angular adjustable movement.

4. In an apparatus for depositing articles into containers, in combination, a substantially horizontal supporting plate having an upper face part of which forms a receiving area for receiving, one by one, articles which are to be deposited with a predetermined position, said plate having spaced from said receiving area a depositing area formed with an opening through which an article may move downwardly into a container beneath said plate; an elongated chute extending downwardly toward said receiving area for directing an article to the latter, the width of said chute being slightly greater than the width of an article so that the latter will be oriented in a given direction when reaching said receiving area; release means cooperating with said chute for releasing an article for movement downwardly along the latter to said receiving area; shifting means located over said plate adjacent to said upper face thereof for shifting an article from said receiving area to said depositing area in alignment with said opening and for maintaining said article in said predetermined orientation identical with the orientation of all other such articles; conveyor means located beneath said plate for conveying containers beneath the latter; and blocking means operatively connected to said plate for movement relative thereto between a blocking position blocking said opening and an unblocking position unblocking said opening to free the latter so that an article may then move downwardly therethrough into a container in a predetermined orientation identical with that of all other articles, said blocking means moving to said unblocking position thereof when a predetermined part of the container is located beneath said opening so that an article will move in a predetermined orientation identical with that of all other articles to said predetermined part of said container.

5. In an apparatus for depositing articles into containers, in combination, a substantially horizontal supporting plate having an upper face part of which forms a receiving area for receiving, one by one, articles which are to be deposited into containers with a predetermined position, said plate having spaced from said receiving area a depositing area where said plate is formed with an opening through which an article may move into a container beneath said plate; locating means carried by said plate at said upper face thereof and at said receiving area for engaging an article delivered to said receiving area to determine orientation of the article on said plate at said receiving area thereof; shifting means located over said plate adjacent to said upper face thereof but spaced from said upper face by a distance which is at least as great as the thickness of said locating means so that said shifting means can move freely over said locating means, said shifting means shifting an article from said receiving area to said depositing area into alignment with said opening and for maintaining said article in said predetermined orientation identical with the orientation of all other such articles; conveyor means located beneath said plate for conveying beneath the latter containers for receiving articles; and blocking means operatively connected to said plate for blocking and unblocking said opening thereof, said blocking means having a blocking position blocking said opening to prevent an article from moving therethrough and an unblocking position freeing said opening so that an article can then move downwardly therethrough into a container in a predetermined orientation identical with that of all other articles, said blocking means moving from said blocking to said unblocking position thereof when a predetermined part of a container is aligned with said opening so that an article will move downwardly through said opening in a predetermined orientation identical with that of all other articles to said predetermined part of a container conveyed by said conveyor means.

References Cited by the Examiner

UNITED STATES PATENTS

| 1,495,178 | 5/1924 | Hodgdon. |
| 2,332,026 | 10/1943 | Suppiger _____ 221—237 X |
| 2,782,577 | 2/1957 | Beall _____ 53—59 |

FOREIGN PATENTS

| 932,098 | 7/1963 | Great Britain. |

TRAVIS S. McGEHEE, *Primary Examiner.*

FRANK E. BAILEY, *Examiner.*

P. H. POHL, R. J. ALVEY, *Assistant Examiners.*